United States Patent
Xiong

(10) Patent No.: US 9,443,155 B2
(45) Date of Patent: Sep. 13, 2016

(54) SYSTEMS AND METHODS FOR REAL HUMAN FACE RECOGNITION

(71) Applicant: Tencent Technology (Shenzhen) Company Limited, Shenzhen, Guangdong (CN)

(72) Inventor: Pengfei Xiong, Guangdong (CN)

(73) Assignee: Tencent Technology (Shenzhen) Co., Ltd., Shenzhen (CN)

( * ) Notice: Subject to any disclaimer, the term of this patent is extended or adjusted under 35 U.S.C. 154(b) by 505 days.

(21) Appl. No.: 14/152,420

(22) Filed: Jan. 10, 2014

(65) Prior Publication Data

US 2016/0224853 A1    Aug. 4, 2016

Related U.S. Application Data

(63) Continuation of application No. PCT/CN2013/085394, filed on Oct. 17, 2013.

(30) Foreign Application Priority Data

May 9, 2013    (CN) .......................... 2013 1 0169250

(51) Int. Cl.
| | |
|---|---|
| *G06K 9/00* | (2006.01) |
| *G06K 9/20* | (2006.01) |
| *G06K 9/62* | (2006.01) |
| *G06K 9/52* | (2006.01) |

(52) U.S. Cl.
CPC ....... *G06K 9/00906* (2013.01); *G06K 9/00281* (2013.01); *G06K 9/00288* (2013.01); *G06K 9/2018* (2013.01); *G06K 9/522* (2013.01); *G06K 9/6212* (2013.01)

(58) Field of Classification Search
None
See application file for complete search history.

(56) References Cited

U.S. PATENT DOCUMENTS

| | | | | |
|---|---|---|---|---|
| 9,075,975 | B2 * | 7/2015 | Bud .......................... | G06F 21/32 |
| 2014/0341422 | A1 * | 11/2014 | Xiong ................ | G06K 9/00275 |
| | | | | 382/103 |
| 2015/0310259 | A1 * | 10/2015 | Lau .......................... | G07C 9/00 |
| | | | | 382/118 |

FOREIGN PATENT DOCUMENTS

| | | |
|---|---|---|
| CN | 101187975 A | 5/2008 |
| CN | 101571594 A | 11/2009 |
| CN | 101604376 A | 12/2009 |
| CN | 102054163 A | 5/2011 |

(Continued)

OTHER PUBLICATIONS

International Search Report issued Feb. 20, 2014 in International Application No. PCT/CN2013/085394.

(Continued)

*Primary Examiner* — Wesley Tucker
(74) *Attorney, Agent, or Firm* — Brinks Gilson & Lione

(57) ABSTRACT

A method for real face image recognition may include obtaining, by at least one processor, an human face image from an original image; obtaining, by at least one processor, a first image by executing a Point Divid Arithmetic Mean Illumination Treatment on the human face image; executing, by at least one processor, a Fourier transformation on the first image and obtaining, by at least one processor, the transformed value of each pixel of the first image; determining, by at least one processor, whether the human face image is a real human face according to the transformed value of each pixel of the first image and the preset classification threshold.

20 Claims, 6 Drawing Sheets

(56) References Cited

FOREIGN PATENT DOCUMENTS

| | | |
|---|---|---|
| CN | 102915435 A | 2/2013 |
| CN | 103049734 A | 4/2013 |

OTHER PUBLICATIONS

Written Opinion issued Feb. 20, 2014 in International Application No. PCT/CN2013/085394.

* cited by examiner

SYSTEMS AND METHODS FOR REAL HUMAN FACE RECOGNITION

PRIORITY STATEMENT

This application is a continuation of International Application No. PCT/CN2013/085394, filed on Oct. 17, 2013, in the State Intellectual Property Office of the People's Republic of China, which claims the priority benefit of Chinese Patent Application No. 201310169250.3 filed on May 9, 2013, the disclosure of which are incorporated herein in their entirety by reference.

BACKGROUND

The present disclosure relates to recognition of a real target object, such as human faces recognition. Specifically, the present disclosure relates to systems and methods for real human faces recognition.

BACKGROUND

With the development of face recognition techniques, the authentication in a secure login system can be done via human face recognition to improve the security of the system. But when authenticating, many impostors can cheat the system by using a faked face. The means of faking a human face include using a picture of a human face, capturing a face from video clips, forging a three-dimensional face model, and etc.

The current means of analyzing the low frequency components of a real target object, such as a human face image, are affected easily by the ambient lighting and the resolution of the acquisition device, which means a real human face can be erroneously determined a faked face due to the increased low frequency components of the real human face in dark light, and the detection accuracy of the face in vivo is lower.

SUMMARY

According to an aspect of the present disclosure, a system for real target objects recognition may include at least one non-transitory computer-readable storage medium, including a set of instructions for target object shape recognition; and at least one processor in communication with the at least one non-transitory computer-readable storage medium that is configured to execute the set of instructions and is configured to: obtain an original image, the original images comprising a target object image; obtain the target object image from the original image; obtain a first image by executing a Point Divid Arithmetic Mean (PDAM) Illumination Treatment on the target object image, the first image comprising a plurality of pixels; perform a Fourier transformation on the first image to obtain a transformed value for each pixel of the plurality of pixels; and determine whether the target object image is a real target object image based on the transformed value of each pixel of the first image and a preset classification threshold.

According to an aspect of the present disclosure, a processor-implemented method for real target objects recognition may include: obtaining, by at least one processor, an original image, the original images comprising a target object image; obtaining, by at least one processor, the target object image from the original image; obtaining, by at least one processor, a first image by executing a Point Divid Arithmetic Mean (PDAM) Illumination Treatment on the target object image, the first image comprising a plurality of pixels; performing, by at least one processor, a Fourier transformation on the first image to obtain a transformed value for each pixel of the plurality of pixels; and determining, by at least one processor, whether the target object image is a real target object image based on the transformed value of each pixel of the first image and a preset classification threshold.

According to an aspect of the present disclosure, a non-transitory computer-readable storage medium may include a set of instruction stored therein for real target objects recognition. The set of instruction may direct at least one processor to perform acts of: obtaining an original image, the original image includes a target object image; obtaining the target object image from the original image; obtaining a first image by executing a Point Divid Arithmetic Mean (PDAM) Illumination Treatment on the target object image, the first image comprising a plurality of pixels; performing a Fourier transformation on the first image to obtain a transformed value of each pixel of the plurality of pixels; and determining whether the target object image is a real target object image based on the transformed value of each pixel of the first image and a preset classification threshold.

BRIEF DESCRIPTION OF THE DRAWINGS

The above and other features and advantages will become more apparent by describing in detail example embodiments thereof with reference to the attached drawings in which.

DETAILED DESCRIPTION

Figure 1:
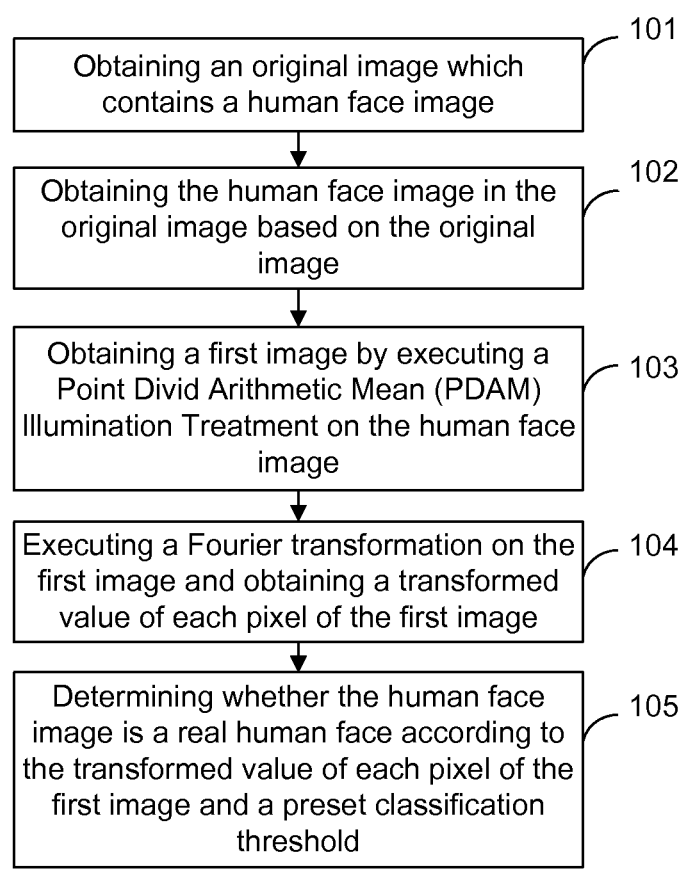
FIG. 1 is a process flow diagram of a method for real human face recognition according to example embodiments of the present disclosure.

Example embodiments will now be described more fully with reference to the accompanying drawings, in which the example embodiments are shown. The example embodiments may, however, be embodied in many different forms and should not be construed as being limited to the example embodiments set forth herein; rather, the example embodiments are provided so that this disclosure will be thorough and complete, and will fully convey the concept of the invention to one skilled in the art. The drawings may be exaggerated for clarity and not necessarily in scale. Like reference numerals in the drawings denote like elements, and thus, their description will not be repeated.

Figure 5:
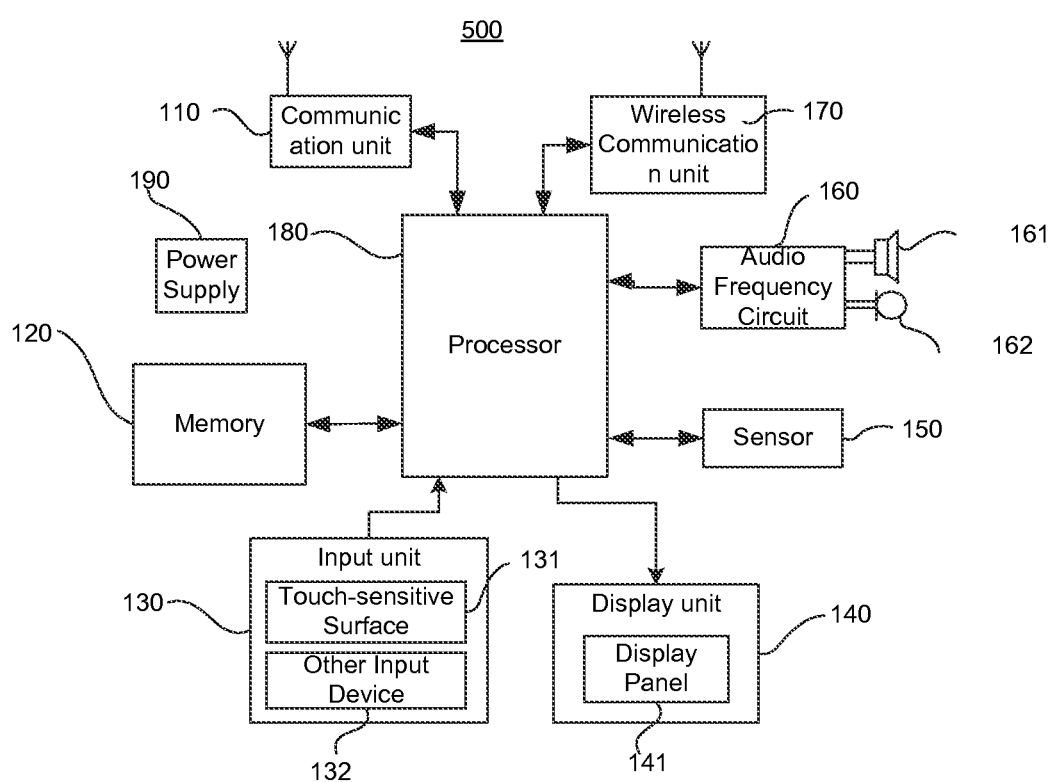
FIG. 5 is schematic diagram of a terminal device according to example embodiments of the present disclosure.

FIG. 5 is a schematic diagram of a terminal device according to example embodiments of the present disclosure. The terminal device may implement the real target object recognition, such as human face recognition, method set forth below.

The Terminal Device 500 may include a Memory 120 which may include one or more computer readable storage media, and a Processer 180 which may include one or more processing cores.

The Memory 120 may be configured to store software programs and modules. The Processor 180 may be in communication with the memory 120, and may be configured to execute the software programs and the modules stored in the Memory 120 to perform various function applications and data processing. The Memory 120 may include a program storage area and a data storage area, wherein the program storage area may be configured to store an operating system for the Terminal Device 500 and programs for at least one function (e.g. sound playback function and/or image playback function, etc.) of the Terminal Device 500, etc.; the data storage area may be configured to store data (e.g. audio data and/or phone book, etc.) created by the Terminal Device 500. In addition, the Memory 120 may also include high-speed random access memories, and may also include non-volatile memory, e.g., at least one disk storage device, flash memory devices, or other volatile solid state memory devices. Accordingly, Memory 120 may also include a memory controller for providing access to Memory 120 by Processor 180 and Input unit 130.

Processor 180 may be the control center of Terminal Device 500 and may be configured to use a variety of interfaces and lines to connect various parts throughout a mobile phone and/or the Terminal Device 500, and execute various functions of the Terminal Device 500 and process data by running or executing software programs and/or modules stored in the Memory 120 and call the data stored in the Memory 120, to achieve the overall control of the mobile phone and/or Terminal Device 500. The Processor 180 may include one or more processing cores. For example, the Processor 180 may be integrated with an application processor and a modem processor, wherein the application processor may be mainly used to process operating system, user interface, and applications etc., the modem processor may be used to process wireless communications. Alternatively, the modem processor may not be integrated into Processor 180.

Merely for illustration, only one processor will be described in the Terminal Device 500 that executes operations in the following example embodiments. However, it should be note that the Terminal Device 500 in the present disclosure may also include multiple processors, thus operations that are performed by one processor as described in the present disclosure may also be jointly or separately performed by the multiple processors. For example, if in the present disclosure a processor of a Terminal Device 500 executes both step A and step B, it should be understood that step A and step B may also be performed by two different processors jointly or separately in the Terminal Device 500 (e.g., the first processor executes step A and the second processor executes step B, or the first and second processors jointly execute steps A and B).

More details of FIG. 5 will be introduced later in the present disclosure.

FIG. 1 is a process flow diagram of a method for real human face recognition according to the example embodiments of the present disclosure. The method may be stored in the Memory 120 as a set of instructions and executed by the Processor 180 in FIG. 5. The execution process may direct the Processor 180 to perform the following acts:

101: Obtaining and/or receiving an original image which may include at least an image of a human face;

Specifically, when the Processor 180 receives a command and/or instruction for human face recognition, the Processor 180 may turn on a camera of a terminal device to acquire the original image of the human face.

The command of the human face recognition may be sent to the Processor 180 by clicking a button for face recognition or may be sent to the Processor 180 by a system login command (e.g., the system may perform face recognition when a user logs in the system).

102: Obtaining the human face image in the original image based on the original image;

Other than the image of the human faces, the original image may also include human bodies, buildings and many other parts. For the convenience of recognizing the human face in the original image, the system and/or the Processor 180 may obtain the human face image in the original image by locating the face and ignoring other parts of the image, so as to improve the accuracy of face recognition.

103: Performing a Point Divid Arithmetic Mean (PDAM) Illumination Treatment on the human face image and obtaining a first image;

In the embodiment, the processor 180 may conduct PDAM Illumination Treatment on every pixel in the human face image, for illumination normalization of robust face recognition against varying lighting conditions. In detail, the processor 180 may calculate a mean value of all the pixels in the human face image, and then for each pixel determine a ratio between the original pixel value and the mean value of the pixels. The Processor 180 then may assign the ratio as the value of the corresponding pixel in the first image.

The PDAM Illumination Treatment may reduce the smoothness of the human face image, and consequently reduce low frequency components of the first image when the first image is processed by Fourier transform.

104: Executing the Fourier transformation on the first image and obtaining the transformed value of each pixel of the first image. To this end, the Processor 180 may perform a Fourier transformation on every pixel in the first image and obtain the transformed value of each pixel;

105: Determining whether the human face image is a real human face according to the transformed value of each pixel of the first image and the preset classification threshold.

The Fourier transformed first image may include a plurality of components. Each of the plurality of components may include a frequency value and an amplitude value. When a component includes a frequency higher than a frequency threshold and an amplitude value greater than a component threshold, the component may be a high frequency component; when a component includes a frequency lower than a frequency threshold and/or an amplitude value lower than a component threshold, the component may be a low frequency component; and a component may be an initial component if its frequency equals to 0.

In this step, the Processor 180 may compute the sum of the high frequency components and sum of all transformed values according to the transformed value of every pixel in the first image, and then execute a further calculation of a high frequency components module, and compare the high frequency components module with a preset classification threshold. The processor may determine that the human face image is a real human face when the high frequency components module is more than the preset classification threshold.

The preset threshold may be determined by training the processor with a plurality of real human face images and a plurality of faked face images, so that the obtained human face image may be regard as a real human face according to the preset threshold. When the high frequency components module is less than the present threshold, the corresponding face image of the High Frequency Components module may be determined as a faked face. When the high frequency components module is more than the preset threshold, the corresponding face image of the High Frequency Components module may be determined as a real human face.

In order to distinguish a real human face from a faked one, the step may require the Processor 180 to build a SVM (Support Vector Machine) classifier according to the above training on real human face images and a plurality of faked face images. When recognizing the human face image, a result of SVM classification may be obtained according to the SVM classifier and the High Frequency Components module of the human face image, and the classified result may determine whether the human face image is a real human face or a faked face.

According to the example embodiments of the present disclosure, the method of real face recognition may apply PDAM Illumination Treatment on the human face image first, so that the Fourier Transformation on the human face image may filter out the low frequency components of the human face image. This ensures the face recognition may not be affected by the lighting condition, thus improves the accuracy of the real human face recognition.

According to the example embodiments of the present disclosure, the method may instruct the Processor 180 to acquire the human face image from the original image based on the original image; to acquire the first image by executing the PDAM Illumination Treatment on the human face image; to get the transformed value of each pixel of the first image by executing the Fourier transformation on the first image; to determine whether the human face image is a real human face according to the transformed value of each pixel of the first image and the preset classification threshold. The technical scheme using the example embodiments of the present disclosure may determine whether the human face image is a real human face by executing the PDAM Illumination Treatment and the Fourier Transformation on the face image captured from the original image, computing the high frequency components, and analyzing the components according to the preset classification threshold and high frequency component module, which may eliminate effects of lighting conditions on the human surface, and improve the accuracy of the real human face recognition without auxiliary equipment and auxiliary operation by an operator. The methods may require less workload of calculation, be easy to use, and have strong real-time performance.

Figure 6:
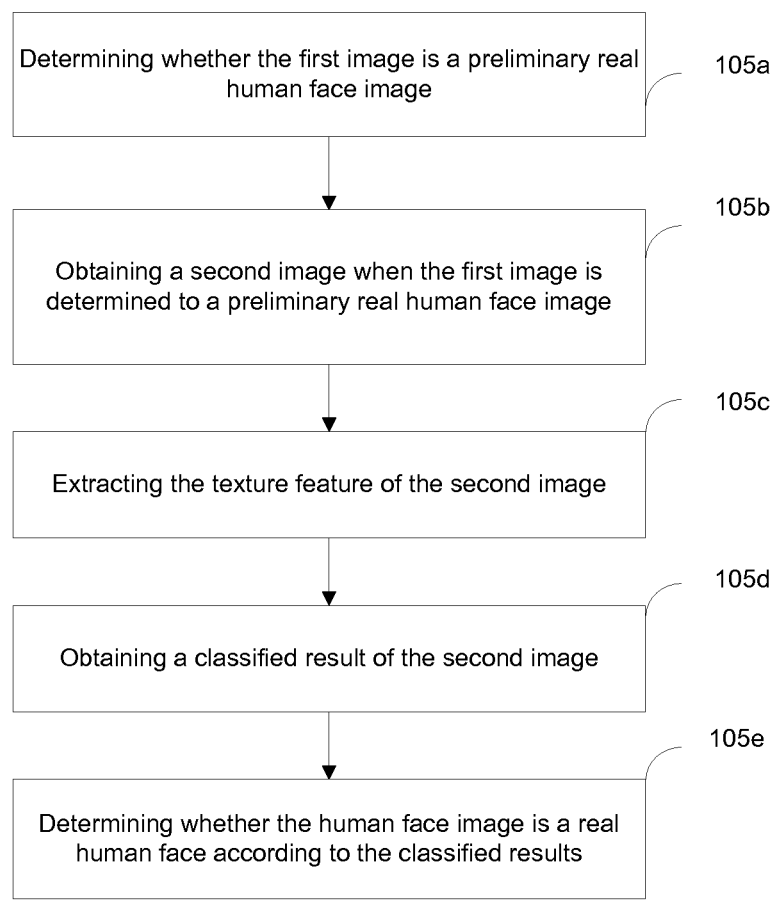
FIG. 6 is a process flow diagram illustrating real human face recognition according to transformed values of pixels of an image and a preset classification threshold according to example embodiments of the present disclosure.

FIG. 6 is a process flow diagram illustrating more details of step 105, according to example embodiments of the present disclosure. The detailed steps in FIG. 6 method may be stored in the Memory 120 as a set of instructions and executed by the Processor 180 in FIG. 5. The execution process may direct the Processor 180 to perform the following acts:

105*a*: Determining whether the first image is a preliminary real human face image according to the transformed value of each pixel of the first image and the preset classification threshold.

To this end, the Processor 180 may be configured to perform the following acts: calculating the sum of the high frequency component values and the sum of all component values of the first image, based on the transformed value, the frequency threshold, and the component threshold of every pixel in the first image; and determining the high frequency components module of the first image, wherein the high frequency components module may be the ratio of the sum of the high frequency components and the difference between the transformed value of all frequency components and the transformed value of the initial components; determining the first image is a preliminary real human face when the high frequency components module is more than the preset threshold, and the first image is a preliminary faked face when the high frequency components module is less than the preset threshold.

The high frequency component may be defined as the component with a frequency higher than the frequency threshold and with a transformed value greater than the component threshold, and the initial component may be defined as the component with a frequency equal to 0.

105*b*: Obtaining a second image by executing a Discrete Cosine Transformation (DCT) Illumination Treatment on the human face image when the first image is determined to be a preliminary real human face image;

Because it is hard to distinguish a real human face from a faked face when the faked face image is captured by a high resolution camera, to avoid incorrectly determining a high resolution faked face image as a real human face through the step 105*a*, the Processor 180 may apply DCT illumination treatment on the human face image that corresponds with the first image to obtain a second image after the first image is determined to a preliminary real human face image, and then make a further determination for the face in the second image.

The DCT illumination treatment is different from the PDAM illumination treatment in that The DCT illumination treatment may keep the texture feature of the original image. With the DCT illumination treatment, the real human face image may be distinguished from the faked high resolution human face image on the premise of eliminating the effect of the lighting condition.

105*c*: Extracting the texture feature of the second image;

The texture feature may be a feature of Histograms of Oriented Gradient (HOG).

105*d*: Obtaining a classified result of the second image according to the texture features of the second image and a preset classification function;

According to the example embodiments of the present disclosure, the preset classification function may be a function that decides whether the second image is a real or faked human face image. Inputting the second image, the present classification function may produce a score which describes whether the human face image is a real or faked human face image. For example, the score may be a real number. For example, when the score is bigger than 0, the second image may be a real face image; when the score is less than 0, the second image may be a faked human face image. The preset classification function may be determined by training the Processor 180 with a plurality of real human face image and a plurality of high resolution faked human face image, until the Processor 180 is accurate enough to distinguish a real human face image from faked ones based on the fixture feature of the second image and the classified result of the preset classification function.

The preset classification function may be determined by a SVM classifier, i.e., to build a SVM classifier according to the training on a plurality of real human face images and a plurality of faked human face images in high resolution. When recognizing the human face image, the classification result may be obtained according to the SVM classifier and the texture feature of the second image.

105*e*: Determining whether the human face image is a real human face according to the classified results.

In this step, the Processor 180 may be configured to determine whether the human face image is a real human face by comparing the classified result of the human face image with the classified results of the trained real human face images and the faked face images.

Thus, by applying the DCT Illumination Treatment on the human face image to extract the texture feature of the human face in the image, the example embodiments of the present disclosure provide a method for further determining whether a human face image is a real human face based on the texture feature and the preset classification function, after determining that the human face image is a preliminary real human face image.

Further, in step 102, to obtain the human face image in the original image based on the original image, the Processor 180 may further be configured to perform acts of: obtaining the position of the face and the eyes by sensing the face in the original image and locating the eyes; and obtaining the human face image in the original image by capturing from the original image according to the position of the face and the positions of the eyes.

In step 105b, to obtain the second image by executing the Discrete Cosine Transformation (DCT) Illumination Treatment on the face image when the first image is determined to a preliminary real human face, the Processor 180 may be further configured to perform acts of: obtaining the DCT transformed value of every pixel of the human face image by executing the DCT transformation on the face image when the first image is determined to a preliminary real human face image; obtaining the DCT image by capturing from the human face image according to the DCT transformed value of every pixel of the human face image; and obtaining the second image by executing an inversed DCT transformation on the DCT image.

Further, before obtaining the first image by executing the Point Divid Arithmetic Mean (PDAM) Illumination Treatment on the human face image in step 103, the Processor 180 may be further configured to perform acts of: obtaining a plurality of real human face image and a plurality of faked human face images; and training the Processor 180 with a plurality of real human face images and a plurality of faked face images in dark light, and determining the preset classification threshold.

Before determining whether a human face image is a real human face according to the transformed value of each pixel of the first image and the preset classification threshold in step 102, the Processor 180 may be further configured to perform acts of: obtaining a plurality of body face images and a plurality of faked human face images in high resolution; and training the Processor 180 with the plurality of real human face images and the plurality of faked face images in high resolution, and determining the preset classification function.

Figure 2:
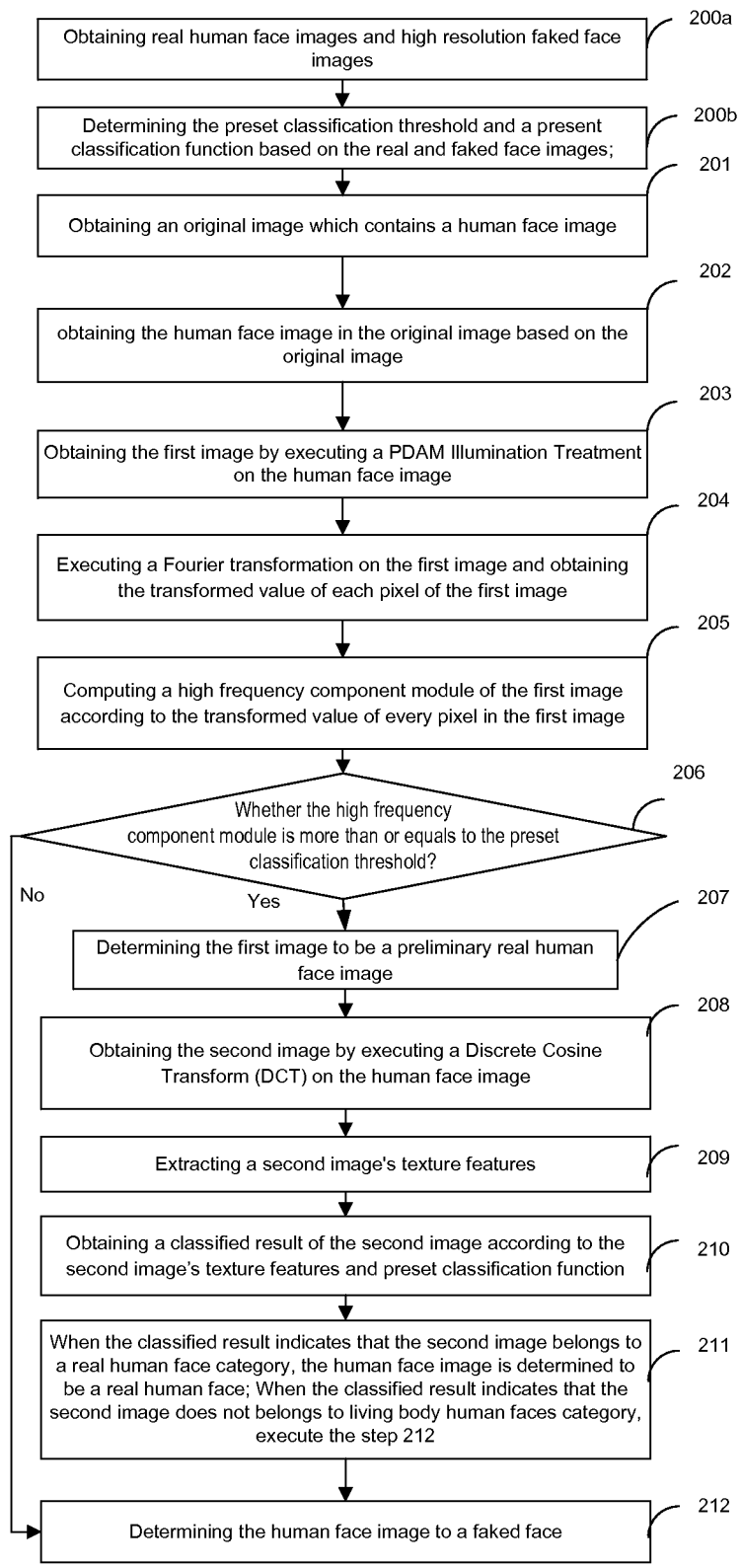
FIG. 2 is a process flow diagram of another method for real human face recognition according to example embodiments of the present disclosure.

FIG. 2 is a process flow diagram of the method for real human face recognition according to the example embodiments of the present disclosure. The method may be stored in the Memory 120 as a set of instructions and executed by the Processor 180 in FIG. 5. The execution process may direct the Processor 180 to perform the following acts:

201: Obtaining an original image which may contain a human face;

The method may also compromise step 200 a and step 200 b before the Step 201:

200a: Obtaining a plurality of real human face images and a plurality of faked face images, wherein the plurality of faked face images may include a plurality of high resolution faked face images;

200b: Training the Processor 180 with a plurality of real human face images and a plurality of faked face images in dark light, and determining the preset classification threshold; and training a plurality of real human face images and a plurality of faked face images in high resolution, and determining the preset classification function.

Building the classifier by training on the human face images captured in step 200a and step 200b, and determining the preset classification threshold and the preset classification function, so as to determine whether the original image is a real human face image by judging the original image according to the preset classification threshold and the preset classification function.

With continuously obtaining sample images for training by the system (e.g., the terminal device), the above training process may keep being iterated. As the quantity of the face image samples become larger, the results of real recognition may become more accurate.

The preset classification threshold may be determined by the training on the image samples, which is adjustable according to the actual conditions when recognizing the real human face. For example, the preset-classification threshold may be reduced when a higher passing rate of the face recognition is needed; the preset-classification threshold may be increased when a higher anti-fake rate of the face recognition is needed. The terminal device may offer several preset classification thresholds for different levels of face recognition passing rate for a user. The user may select the right preset classification threshold accordingly to his/her actual need.

202: Obtaining the human face image in the original image based on the original image;

For the original image, the Processor 180 may obtain the position of the face frame in the image by a face sensing method of adaboost and haar features, and locat the position of the eyes in the face frame, and capture an effective area around the eyes as the image of human face (i.e. the human face image). For example, the effective area may be in a size of 64×64 pixels.

203: Obtaining the first image by executing the PDAM Illumination Treatment on the human face image;

The pixel value of every pixel in the M*N area of the face image is $I_{M*N}$, the mean value $I_{aver}$ of the face image may be calculated by applying the followed formula:

$$I_{aver} = \frac{\sum I_{M*N}}{M*N};$$

and the ratio of the initial pixel value of every pixel to the mean value $I_{aver}$ may be determined as the pixel value of all pixels in the first image $I_{pdam}$. The formula for $I_{pdam}$ may be $$I_{pdam} = \left\{ \frac{I_i}{I_{aver}} \right\}.$$

204: Executing the Fourier transformation on the first image and obtaining the transformed value of each pixel of the first image;

To this end, the Processor 180 may execute the Fourier transformation on the first image and obtaining the transformed value of each pixel of the first image by applying the formula:

$$M=f(I_{pdam}).$$

205: Computing the high frequency component module of the first image according to the transformed value of every pixel in the first image;

To this end, the Processor 180 may calculate the sum of the high frequency component $M_{high}$ and the sum of all component values $M_{all}$ according to the transformed value of all pixels in the first image.

$$M_{high} = \Sigma M_i,$$

wherein, $i > f_{high}$, $M_i >$ thres; $f_{high}$ is the frequency threshold, thres is the component threshold; $M_{all} = \Sigma M_j$, $j \in \text{rect}_{M*N}$;

The Processor 180 may then determine the ratio between the sum of the transformed values of high frequency components and the difference between the transformed value of all components and the transformed value of initial component to the high frequency component module HFD of the first image:

$$HFD = \frac{M_{high}}{M_{all} - M_0};$$

wherein $M_0$ is the initial component value.

206: Judging whether the high frequency component module is more than or equals to the preset classification threshold. If yes, the Processor 180 may perform step 207; if no, the processor may perform step 212;

207: Determining the first image to a preliminary real human face image;

In order to improve the recognition accuracy, when determining that the high frequency component module is more than or equals to the preset classification threshold, the Processor 180 may not conclude that the human face image is a real human face image because the face image could still be a high resolution faked face image. Accordingly, the Processor 180 may process the human face image in the step 202 step by step to determine if the face image is a real human face image rather than a high resolution faked face image.

208: Obtaining the second image by executing the Discrete Cosine Transformation (DCT) on the human face image;

In this step, the Processor 180 may apply the formula:

$$L_{dct} = idct(dct(I)_{i \in rect_{dct}})$$

to the human face image; and then execute DCT transformation on the face image, and obtain the DCT transformed value of every pixel in the face image; then obtain the DCT image by capturing the human face image according to the DCT transformed value of every pixel in the face image, and executing an inverse DCT transformation on the acquired DCT image to get the second image, of which the pixel value of every pixel is $I_{dct}$. During this process, only the effective DCT area may be captured when capturing the human face image. Here, the effective area may be one or more areas where the DCT transformed values of the pixels thereon change smoothly or areas where the DCT transformed values of the pixels therein meet preset criteria. Standards of being effective may be determined randomly by the system or may be determined by an operator of the system.

209: Extracting the texture features of the second image;

210: Obtaining classified results of the second image according to the texture features of the second image and the preset classification function;

211: When the classified results indicate that the second image belongs to real human face category, the human face image may be determined to be a real human face; when the classified results indicate that the second image does not belong to real human faces category, the Processor 180 may execute step 212;

212: Determining the human face image to a faked face.

In this step, the Processor 180 may determine whether the human face image is a real human face according to the classified results.

Note that the preset classification function and classified results may be determined after training the Processor 180 with a plurality of real human faces and a plurality of high resolution faked faces.

Taking the SVM classifier as an example to determine the preset classification function, when the classification result is 1, the original image may be determined as a real human face. When the classification result is 0, the original image may be determined a faked face, and consequently determine the second image's classified results according to second image's texture features and preset classification function: when the classification result is 1, the Processor 180 may determine that the second image is a real image, i.e. the human face image may be a real human face; when the classification result is 0, the Processor 180 may determine that the second image is not a real human image, i.e. the human face image may be a faked face.

The executive subject (e.g., the Terminal Device 500 and/or the Processor 180) of the example embodiments of the present disclosure may be a terminal device; the terminal device may be a mobile terminal or a fixed terminal, e.g. a mobile phone or an access recognizer etc. The terminal device may be configured with a camera. After the original image is acquired by the terminal device and the real human face recognition is executed on the original image, the real human face verification may be passed when the executive subject determines that the original image includes real human face image. The executive subject may also be a verification server. When the original image is acquired by the terminal device, the original image may be transmitted to the verification server and executed for real human face recognition by the server. After that the real human face recognition result may be transmitted to the terminal device. The real human face verification may be passed when the real human face recognition result is received by the terminal device and the result indicates that the original image includes real human face image.

The real human face recognition method according to the example embodiments of the present disclosure may be implemented to scenarios such as the pedestrian traffic statistics or authentication. While in authenticating, such as authentication login or access authentication, the acquired human face image may be verified whether it is a real human face by the method provided by the embodiment of the present disclosure. Additionally, the verification process may also include step 200:

200: Matching an obtained human face image with a saved human face image on a local terminal device. The obtained human face image may pass the matching verification when the saved human face image matches the saved human face image.

In the example embodiments of the present disclosure, the terminal device may obtain the human face image of a user who is allowed to pass the verification in advance, and may save the image on the local terminal device (e.g., the Terminal Device 500). During an authentication, the local terminal device may execute step 200 to first determine whether an obtained human face image is a real human face, and meanwhile verify whether the obtained human face image matches the saved human face image of the user who is allowed to pass the verification. To this end, the Processor 180 and/or the local terminal device may browse through all the human face images saved in the local terminal, and executing matching according to the texture features of the obtained human face image and the texture features of the saved human face images in the local terminal. The obtained human faces may pass the matching verification when any human face image saved the local terminal matches the human face image, which may indicate the obtained human face image is the human face image of the user who is allowed to pass the verification. The step 200 may be executed simultaneously with the real human face recognition process, i.e. the real human face verification and the matching verification may be performed respectively after the human face image is obtained. The human face image verification may pass when both the real human face verification and the matching verification are passed, then the subsequent login process or passing access etc. may be executed. The step 200 may also be executed after the real human face verification is passed, i.e. executing the matching recognition with the saved human face images on the local terminal until the human face image is determined to be a real human face. The human face image verification may be passed when the matching verification is passed, then the subsequent login process or passing access etc. may be executed.

Figure 3:
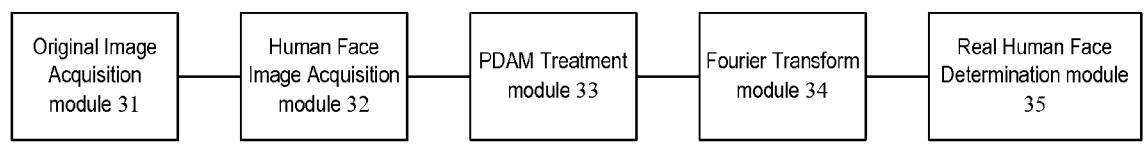
FIG. 3 is a schematic diagram of a system for real human face recognition according to example embodiments of the present disclosure.

FIG. 3 is a schematic structure of a system for real human face recognition according to example embodiments of the present disclosure. As shown in FIG. 3, the system may include: Original Image Acquisition module 31, Human Face Image Acquisition module 32, PDAM Treatment module 33, Fourier Transformation module 34 and Real Human Face Determination module 35.

The Original Image Acquisition module 31 is configured to obtain the original image which may contain the human face. The Human Face Image Acquisition module 32 may connect to the Original Image Acquisition module 31. The Human Face Image acquisition module 32 may be configured to obtain the human face image in the original image based on the original image. The PDAM Treatment module 33 may connect to the Human Face Image Acquisition module 32. The PDAM Treatment module 33 may be configured to obtain the first image by executing the Point Divid Arithmetic Mean (PDAM) Illumination Treatment on the human face image. The Fourier Transformation module 34 may connect to the PDAM Treatment module 33. The Fourier Transformation module 34 may be configured to execute the Fourier transformation on the first image and obtain the transformed value of each pixel of the first image. The Real Human Face Determination module 35 may connect to the Fourier Transformation module 34. The Real Human Face Determination module 35 may be configured to determine whether the human face image is a real human face according to the transformed value of each pixel of the first image and the preset classification threshold.

The above modules may be implemented in web pages and may adopt the same method as set forth in FIGS. 1 and 2.

Figure 4:
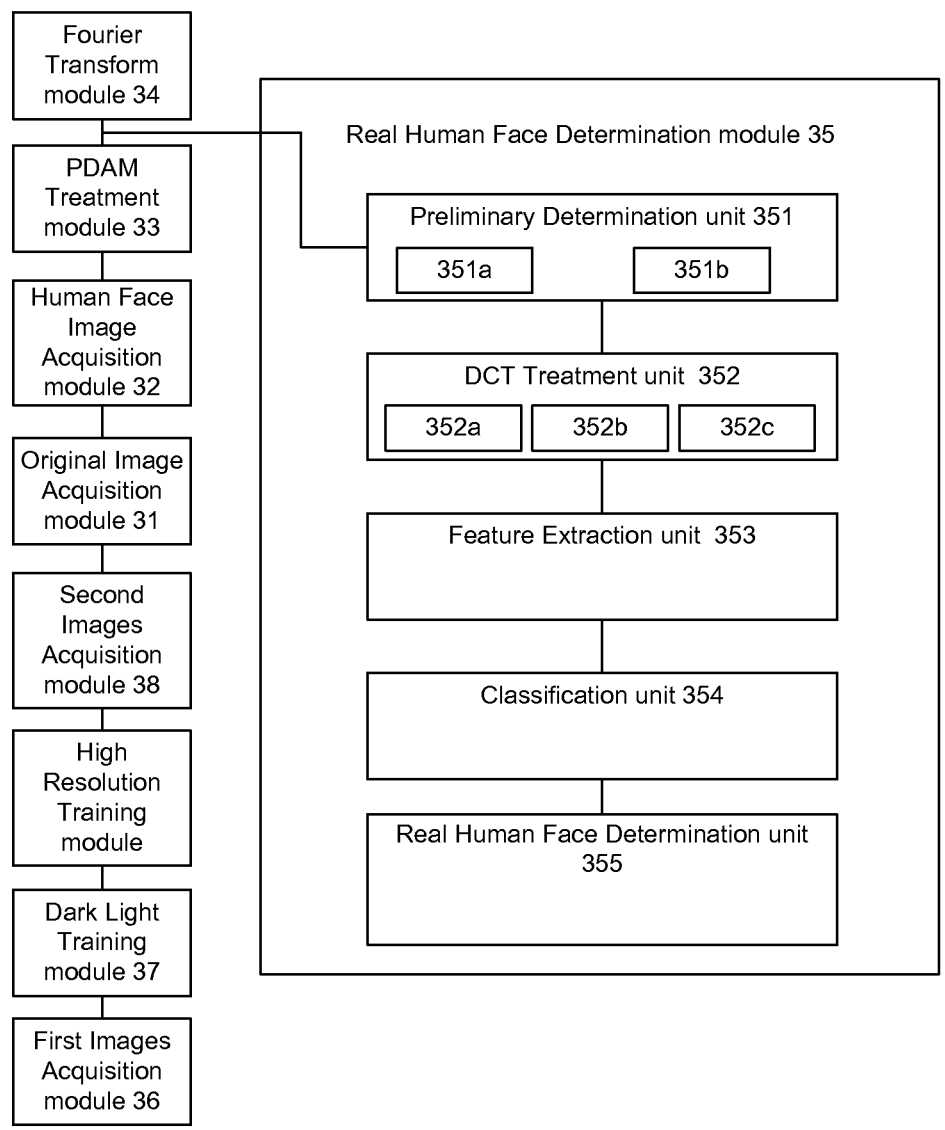
FIG. 4 is a schematic diagram of another system for real human face recognition according to example embodiments of the present disclosure.

FIG. 4 is a schematic structure of a real human face recognition system according to the example embodiments of the present disclosure. The system may include all the technical scheme of the system shown in FIG. 3. In addition, the Real Human Face Determination module 35 may further include: Preliminary Determination unit 351, DCT Treatment unit 352, Feature Extraction unit 353, Classification unit 354, and Real Human Face Determination unit 355;

The Preliminary Determination unit 351 may be connected to Fourier Transformation module 34 and may be configured to determine whether the first image is a preliminary real human face image according to the transformed value of each pixel of the first image and the preset classification threshold; the DCT Treatment unit 352 may be connected to the Preliminary Determination unit 351 and may be configured to obtain the second image by executing the Discrete Cosine Transformation (DCT) Illumination Treatment on the human face image when the first image is determined to a preliminary real human face image; the Feature Extraction unit 353 may be connected with DCT Treatment unit 352 and may be configured to extract extracting the second image's texture features; the Classification unit 354 may be connected with Feature Extraction unit 353 and may be configured to obtain the classified result of the second image according to the second image's texture features and the preset classification function; the Real Human Face Determination unit 355 may be connected with Classification unit 354 and may be configured to determine whether the human face image is a real human face according to the classified results.

The Human Face Image Acquisition module 32 may include a Positioning unit 351$a$ being configured to obtain the positions of the face and the eyes by sensing the face and locating the eyes in the original image; and a Face Acquisition unit 352$b$ being configured to obtain the human face image in the original image by capturing from the original image according to the position of the face and the positions of the eyes.

The DCT Treatment unit 352 may include a DCT Transformation subunit 352$a$ being configured to obtain the DCT transformed value of every pixel of the human face image by executing the DCT transformation on the human face image when the first image is determined to a preliminary real human face image; a DCT Image Acquisition subunit 352$b$ for obtaining the DCT image by capturing from the human face image according to the DCT transformed value of every pixel of the human face image; and a Inversed DCT Transformation subunit 352$c$ for obtaining the second image by executing an inversed DCT transformation on the DCT image.

The system may also include a First Images Acquisition module 36 being configured to obtain a plurality of real human face images and a plurality of faked face images; and a Dark Light Training module 37 being configured to train the Processor 180 with a plurality of real human face images and a plurality of faked face images in dark light, and determine the preset classification threshold.

The system may also includes a Second Images Acquisition module 38 being configured to obtain a plurality of real human face images and a plurality of faked face images in high resolution; and a High Resolution Training module 39 being configured to train the Processor 180 a plurality of real human face images and a plurality of faked face images in high resolution, and determine the preset classification function.

The above real human face recognition system according to the example embodiments includes certain modules being configured to recognize the real human face. Each module is designed for certain functions. The functions may also be assigned to different module to complete the functions as required, i.e., the system may include different modules with different function permutations to complete the all or part of functions described above. Additionally, the real human face recognition system may adopt the method for the real human face recognition as set forth above.

FIG. 5 is a schematic diagram of a terminal device according to the example embodiments of the present disclosure. The terminal device may implement the real human face recognition method set forth above.

The Terminal Device 500 may include a Communication unit 110, the Memory 120 which may include one or more non-transitory computer-readable storage medium, an Input unit 130, a Display unit 140, a Sensor 150, an Audio Frequency Circuit 160, a Wifi (wireless fidelity) Module 170, and the Processer 180 which may include one or more processing cores and Power Supply 190 etc. A person skilled in the art know that the terminal device is not limited to its structure shown in FIG. 5, it may include more or less components than components in the figure, or may combine any component or adopts different component layout that the person skilled in the art may conceive at the time that the application is filed.

The Communication unit 110 may be configured to receive and transmit signals during a call or when the Terminal Device 500 is sending and/or receiving information. The Communication unit 110 may be a RF (Radio Frequency) circuit, router, modem and other network communication equipment. When the Communication unit 110 is a RF circuit, it may receive downlink information from a base station of a wireless communication network and may send the received information to one or more Processor 180 for processing. Additionally, the Communication unit 110 may send data related to uplink to the base station. The RF circuit as the Communication unit 110 may include, but not limited to, an antenna, at least one amplifier, a tuner, one or more oscillators, a User Identity Module (SIM) card, a transceiver, a coupler, a LNA (Low Noise Amplifier), and a duplexer, etc. In addition, the Communication unit 110 may also communicate with other equipment via wireless communications and networks. The wireless communication may use any communication standards or protocols, including but not limited to GSM (Global System of Mobile communication), GPRS (General Packet Radio Service), CDMA (Code Division Multiple Access), WCDMA (Wideband Code Division Multiple Access), LTE (Long Term Evolution), e-mail, SMS (Short Messaging Service), etc.

The Input unit 130 may be configured to receive numbers or characters inputted into the Terminal Device 500, and/or generate signal input related to user settings and/or device functions from a keyboard, mouse, joystick, and optical or trackball. The Input unit 130 may also include Touch-sensitive Surface 131 and other Input Device 132. The Touch-sensitive Surface 131, also referred to touch display screen or touch pad, may be configured to collect touch operations on or near the screen or pad (e.g. the operations on or near the Touch-sensitive Surface 131 by suitable objects or accessories such as user fingers, stylus etc.), and drive corresponding connecting devices based on preset programs and/or procedures. The Touch-sensitive Surface 131 may include two parts, a touch detection device and a touch controller. The touch detection device may be configured to detect the user's locations and the signal formed by touch operations, and transmit the signal to the touch controller; the touch controller may be configured to receive the touch information from the touch detection device and transform the signal into contact coordinates which will be sent to Processor 180, and receive and execute commands from Processor 180. In addition, the Touch-sensitive Surface 131 may be configured to be resistance-sensitive type, capacity-sensitive type, infrared-sensitive type and surface-acoustic-waves-sensitive type. Other than the touch-sensitive surface 131, the Input unit 131 may also include other Input Device 132. For example, the Input Device 132 may include, but not limited to, one or more of physical keyboards, function keys (e.g. volume control buttons, switch keys, etc.), trackballs, mouse, joysticks, etc.

The Display unit 140 may be configured to display information entered by the user, information provided to the user, or a variety of graphical user interfaces from the Terminal Device 500. The graphical user interfaces may be graphics, texts, icons, videos, and/or any combination thereof. The Display unit 140 may also include Display Panel 141 which may include LCD (Liquid Crystal Display), OLED (Organic Light-Emitting Diode) etc. Furthermore, the Display Panel 141 may be covered by the Touch-sensitive Surface 131, so that when the Touch-sensitive Surface 131 detects touch operations on or near itself, it may send a signal to Processor 180 to determine the type of the touch event, then Processor 180 may provide corresponding visual outputs on the Display Panel 141 depending on the type of the touch event. In FIG. 5, the Touch-sensitive Surface 131 and the Display Panel 141 are two separate components for input and output, but the present disclosure intends to cover the broadest scope that the Touch-sensitive Surface 131 and the Display Panel 141 may teach. For example, the Touch-sensitive Surface 131 and the Display Panel 141 may be integrated into a single component, achieving the input and output function.

The Terminal Device 500 may also include at least one Sensor 150, e.g., optical sensors, motion sensors, and/or other sensors. The optical sensor may include an ambient light sensor, and/or a proximity sensor, wherein, the ambient light sensor may adjust the brightness of the Display Panel 141 according to the ambient light and darkness, the proximity sensor may turn off Display Panel 141 and/or backlight when the Terminal Device 500 is moved to a position where no visual display is needed (e.g., when the Terminal Device is moved to the ear during a phone call). The motion sensors may include one or more gravity acceleration sensors. The gravity acceleration sensor may be configured to detect a magnitude of acceleration on all directions (e.g., triaxial direction). When the gravity sensor is stationary (i.e., the Terminal Device is not moving or accelerating), the gravity sensor may be able to detect the magnitude and direction of gravity and may be used to recognize the posture of the Terminal Device 500 (e.g. such recognition may be used to rotate images shown on the screen of the Terminal Device 500 when the posture of the Terminal Device 500 is changed from vertical to horizontal, or may be used to calibrate postures for some electronic games and magnetometer), and vibration recognition related functions (e.g. pedometers and percussions), etc. The Terminal Device 500 may also include a gyroscope, barometer, hygrometer, thermometer, infrared sensors, and/or other sensors.

The Audio Circuit 160, Speaker 161, and Speaker 162 may provide audio interfaces between the user and Terminal Device 500. The Audio Circuit 160 may convert the received audio data into electrical signals, which may be transmitted to the Speaker 161, in which the electrical signals may be converted into an output sound signal. On the other hand, the Speaker 162 may receive and convert sound signals into electrical signals and send the electrical signals to the Audio Circuit 160. The Audio Circuit 160 may receive the electrical signals, convert them into audio data, and send the audio date to the Processor 180 for processing. The Processor 180 may process the audio data and transmit the audio data to another terminal device via RF Circuit 110 or send the audio data to Memory 120 for further processing. The Audio Circuit 160 may also include earplug jack to provide communication between the peripheral headset and Terminal Device 500.

To achieve wireless communication, the Terminal Device 500 may include a Wireless Communication unit 170 which may be a WiFi module. WiFi is a technology of short range wireless transmission. The Terminal Device 500 may send and receive email, browse the web and access streaming media etc. via the Wireless Communication unit 170. It may provide to a user wireless broadband Internet access.

The Terminal Device 500 may also include Power Supply 190 (e.g. a battery) which powers the various components. The power supply may have a logic connection with the Processor 180 via the power supply management system, so that may be able to perform functions such as charging, discharging, and power consumption management via the power supply management system. The Power Supply 190 may also include one or more components such as DC or AC power supply, recharging system, power supply failure detection circuit, power supply converter, or inverter and power supply status indicator etc.

Although not shown in Figure, Terminal Device 500 may also include camera, Bluetooth module etc.

According to the example embodiments of the present disclosure, the Display unit 140 of the Terminal Device 500 may be a touch display screen, the Terminal Device 500 may also include memories and one or more programs, wherein the one or more programs may be stored in the memories and may be executed by one or more processors to execute the following commands and/or operations:

Obtaining an original image which may include a human face image;

Obtaining the human face image in the original image based on the original image;

Obtaining a first image by executing a Point Divid Arithmetic Mean (PDAM) Illumination Treatment on the human face image;

Executing Fourier transformation on the first image and obtaining a transformed value of each pixel of the first image;

Determining whether the human face image is a real human face according to the transformed value of each pixel of the first image and a preset classification threshold.

The commands and/or operations may also include:

Determining whether the first image is a preliminary real human face image according to the transformed value of each pixel of the first image and the preset classification threshold.

Obtaining a second image by executing a Discrete Cosine Transformation (DCT) Illumination Treatment on the human face image when the first image is determined to be a preliminary real human face image;

Extracting text features of the second image;

Obtaining a classified result of the second image according to the texture features of the second image and the preset classification function;

Determining whether the human face image is a real human face according to the classified result.

The commands and/or operations may also include:

Obtaining positions of the face and the eyes in the human face image by sensing the face in the original image and locating the eyes.

Obtaining the human face image in the original image by capturing the human face image from the original image according to the position of the face and the positions of the eyes.

The commands and/or operations may also include:

Obtaining the DCT transformed value of every pixel of the human face image by executing the DCT transformation on the human face image when the first image is determined to a preliminary real human face image;

Obtaining the DCT image by capturing from the human face image according to the DCT transformed value of every pixel of the human face image;

Obtaining the second image by executing an inversed DCT transformation on the DCT image.

The commands and/or operations may also include:

Obtaining a plurality of real human face images and a plurality of faked face images;

Training the Processor 180 with a plurality of real human face images and a plurality of faked face images in dark light, and determining the preset classification threshold.

The commands and/or operations may also include:

Obtaining a plurality of real face human images and a plurality of high resolution faked face images;

Training the Processor 180 with the plurality of real human face images and the plurality of high resolution faked face images, and determining the preset classification function.

A person of ordinary skill in the art will understand that realization of all or part of the above procedures may be achieved via hardware or related hardware instructed by programs which may be stored in one non-transitory computer-readable storage medium. For example, the non-transitory computer-readable storage medium may be a read-only memory, a disk, or a CD-ROM etc.

The following describes an experiment based on the methods and systems for human face recognition according to the example embodiments of the present disclosure. The experiment establishes a dataset which contains 10400 images, of which there are 4000 real human face images in high solution, 6000 faked face images, 200 real human face images and 200 faked face images in dark light. 3000 images in high solution are selected to train the high frequency image component detection module, 100 images in dark light are selected to train the detailed texture detection module. The textures in real human face images and the faked face images are almost the same in dark light, but after PDAM illumination and Fourier transformation, the differences between the real human face images and the faked face images are much large. The Fourier transformed high frequency components of the real human face images and faked face images in high solution are almost the same, but they show different image highlights after the DCT transformation treatment.

Table 1 shows the experimental results of the above experiment. The number of images in table 1 is the number of images that are identified as real human face.

TABLE 1

| | | Fourier determination without PDAM treatment | Fourier determination after PDAM treatment | SVM determination |
|---|---|---|---|---|
| Dark light | Real human faces 150 | 6 | 138 | 121 |
| | Faked faces 150 | 4 | 13 | 3 |

TABLE 1-continued

| | | Fourier determination without PDAM treatment | Fourier determination after PDAM treatment | SVM determination |
|---|---|---|---|---|
| High resolution image | Real human faces 2500 | 1648 | 2308 | 2207 |
| | Faked faces 3500 | 521 | 796 | 121 |

It may be seen from Table 1 that a large number of real human faces are determined to be faked faces in the dark light without PDAM light treatment, but almost all of these mistakes are corrected after the PDAM treatment. Although there are several faked images are mistakenly determined to be real human faces after the PDAM treatment, the faked images are filtered out again via SVM determination in HOG features. Eventually, the obtained accuracy for recognizing faked human face is 96.6%, and the accuracy for recognizing real human face is 87.8%. Due to the required higher anti-counterfeiting rate in face recognition system, and face verification process is video streaming, so the accuracy may satisfy the requirements of real-time face recognition system.

Furthermore, thresholds in the present disclosure may be predetermined constant values or may be adjustable parameters. For example, a user or an operator may choose appropriate threshold values based on the actual needs to determine whether to choose a higher pass rate or a higher anti-counterfeiting rate. The user or the operator may even define different levels of threshold to allow the user to select which mode is more reasonable.

While the example embodiments of the present disclosure relate to systems and methods of real human face recognition, the systems and methods may also be applied to other applications. For example, in addition to face recognition, the systems and methods may also be applied in other pattern recognition, such as fingerprint recognition. The present disclosure intends to cover the broadest scope of image and/or shape identification technologies that a computer process may obtain.

Thus, example embodiments illustrated in FIGS. 1-6 serve only as examples to illustrate several ways of implementation of the present disclosure. They should not be construed as to limit the spirit and scope of the example embodiments of the present disclosure. It should be noted that those skilled in the art may still make various modifications or variations without departing from the spirit and scope of the example embodiments. Such modifications and variations shall fall within the protection scope of the example embodiments, as defined in attached claims.

The invention claimed is:

1. A system for real target objects recognition, comprising:
    at least one non-transitory computer-readable storage medium, comprising a set of instructions for target object shape recognition; and
    at least one processor in communication with the at least one non-transitory computer-readable storage medium that is configured to execute the set of instructions comprising instructions to:
        obtain an original image, the original image comprising a target object image;
        obtain the target object image from the original image;
        obtain a first image by executing a Point Divid Arithmetic Mean (PDAM) Illumination Treatment on the target object image, the first image comprising a plurality of pixels;
        perform a Fourier transformation on the first image to obtain a transformed value for each pixel of the plurality of pixels; and
        determine whether the target object image is a real target object image based on the transformed value of each pixel of the first image and a preset classification threshold.

2. The system according to claim 1, wherein to determine whether the target object image is a real target object image the at least one processor is further configured to:
    determine whether the first image is a preliminary real target object image; and
    when the first image is a preliminary real target object image:
        obtain a second image by executing a Discrete Cosine Transformation (DCT) Illumination Treatment on the target object image;
        extract a texture feature of the second image;
        obtain a classified result of the second image based on the texture feature of the second image and a preset classification function; and
        determine whether the target object image is a real target object image based on the classified result.

3. The system according to claim 2, wherein the Fourier transformed first image comprises a plurality of components,
    wherein each of the plurality of components comprises a frequency value and an amplitude value,
    wherein the plurality of components comprise a plurality of high frequency components, each of the plurality of high frequency components comprises a frequency higher than a frequency threshold and an amplitude value greater than a component threshold; and
    wherein the plurality of components comprise an initial component comprising a frequency equals to 0.

4. The system according to claim 3, wherein to determine whether the first object image is a preliminary real target image, the at least one processor is further configured to:
    calculate a first summation, being a sum of the amplitude values of the plurality of high frequency components of the Fourier transformed first image;
    calculate a second summation, being a sum of the amplitude values of the plurality of components of the Fourier transformed first image;
    determine a difference between the second summation and the amplitude value of the initial component of the Fourier transformed first image;
    determine a high frequency components module of the first image, being a ratio of the first summation and the difference;
    determine that the first image is a preliminary real target object image when the high frequency components module is greater than a preset threshold, and
    determine that the first image is a preliminary faked target object image when the high frequency components module is less than the preset threshold.

5. The system according to claim 2, wherein to execute the DCT Treatment on the target object image, the at least one processor is further configured to:
    obtain a DCT transformed value of every pixel of the target object image by executing the DCT transformation on the target object image;

capture, from an effective area of the DCT transformed target object image, a DCT image based on the DCT transformed value of every pixel of the target object image; and obtain the second image by executing an inversed DCT transformation on the DCT image.

6. The system according to claim 5, wherein the effective area is an area on the DCT transformed target object image where the DCT transformed values of the pixels thereon change smoothly or where the DCT transformed values of the pixels thereon meet a preset criteria.

7. The system according to claim 1, wherein the target object is a face;

wherein to obtain a face image from the original image, the at least one processor is further configured to:

obtain a position of the face and eyes of the face by sensing the face in the original image and by locating the eyes; and obtain the face image in the original image by capturing the face image from the original image based on the position of the face and the positions of the eyes.

8. The system according to claim 2, wherein the at least one processor is further configured to perform at least one of:

training the at least one processor with a plurality of real target object images and a plurality of faked face images in dark light to determine the preset classification threshold; and training the at least one processor with a plurality of real target object images and a plurality of high resolution faked face images to determine the preset classification function.

9. A processor-implemented method for real target objects recognition, comprising:

obtaining, by at least one processor, an original image, the original image comprising a target object image;

obtaining, by at least one processor, the target object image from the original image;

obtaining, by at least one processor, a first image by executing a Point Divid Arithmetic Mean (PDAM) Illumination Treatment on the target object image, the first image comprising a plurality of pixels;

performing, by at least one processor, a Fourier transformation on the first image to obtain a transformed value for each pixel of the plurality of pixels; and determining, by at least one processor, whether the target object image is a real target object image based on the transformed value of each pixel of the first image and a preset classification threshold.

10. The method according to claim 9, wherein determining whether the target object image is a real target object image comprises:

determining, by at least one processor, whether the first image is a preliminary real target object image; and when the first image is a preliminary real target object image:

obtaining, by at least one processor, a second image by executing a Discrete Cosine Transformation (DCT) Illumination Treatment on the target object image;

extracting, by at least one processor, a texture feature of the second image;

obtaining, by at least one processor, a classified result of the second image based on the texture feature of the second image and a preset classification function; and determining, by at least one processor, whether the target object image is a real target object image based on the classified result.

11. The method according to claim 10, wherein the Fourier transformed first image comprises a plurality of components, wherein each of the plurality of components comprises a frequency value and an amplitude value, wherein the plurality of components comprise a plurality of high frequency components, each of the plurality of high frequency components comprises a frequency higher than a frequency threshold and an amplitude value greater than a component threshold; and wherein the plurality of components comprise an initial component comprising a frequency equals to 0.

12. The method according to claim 11, wherein determining whether the first object image is a preliminary real target image further comprises:

calculating, by at least one processor, a first summation, being a sum of the amplitude values of the plurality of high frequency components of the Fourier transformed first image;

calculating, by at least one processor, a second summation, being a sum of the amplitude values of the plurality of components of the Fourier transformed first image;

determining, by at least one processor, a difference between the second summation and the amplitude value of the initial component of the Fourier transformed first image;

determining, by at least one processor, a high frequency components module of the first image, being a ratio of the first summation and the difference;

determining, by at least one processor, that the first image is a preliminary real target object image when the high frequency components module is greater than a preset threshold, and determining, by at least one processor, that the first image is a preliminary faked target object image when the high frequency components module is less than the preset threshold.

13. The method according to claim 10, wherein executing the DCT Treatment on the target object image further comprises:

obtaining, by at least one processor, a DCT transformed value of every pixel of the target object image by executing the DCT transformation on the target object image;

capture, by at least one processor from an effective area of the DCT transformed target object image, a DCT image based on the DCT transformed value of every pixel of the target object image; and obtaining, by at least one processor, the second image by executing an inversed DCT transformation on the DCT image.

14. The method according to claim 13, wherein the effective area is an area on the DCT transformed target object image where the DCT transformed values of the pixels thereon change smoothly or where the DCT transformed values of the pixels thereon meet a preset criteria.

15. The method according to claim 9, wherein the target object is a face;

wherein obtaining a face image from the original image comprises:

obtaining, by at least one processor, a position of the face and eyes of the face by sensing the face in the original image and by locating the eyes; and obtaining, by at least one processor, the face image in the original image by capturing the face image from the original image based on the position of the face and the positions of the eyes.

16. The method according to claim 10, further comprising at least one of:
training, by at least one processor, the at least one processor with a plurality of real target object images and a plurality of faked face images in dark light to determine the preset classification threshold; and
training, by at least one processor, the at least one processor with a plurality of real target object images and a plurality of high resolution faked face images to determine the preset classification function.

17. A non-transitory computer-readable storage medium, comprising a set of instruction stored therein for real target objects recognition, the set of instruction to direct at least one processor to perform acts of:
obtaining an original image, the original image comprises a target object image;
obtaining the target object image from the original image;
obtaining a first image by executing a Point Divid Arithmetic Mean (PDAM) Illumination Treatment on the target object image, the first image comprising a plurality of pixels;
performing a Fourier transformation on the first image to obtain a transformed value of each pixel of the plurality of pixels; and
determining whether the target object image is a real target object image based on the transformed value of each pixel of the first image and a preset classification threshold.

18. The storage medium according to claim 17, wherein in determining whether the target object image is a real target object image, the set instructions further direct the at least one processor to perform acts of:
determining whether the first image is a preliminary real target object image; and
when the first image is a preliminary real target object image:
obtaining a second image by executing a Discrete Cosine Transformation (DCT) Illumination Treatment on the target object image;
extracting a texture feature of the second image;
obtaining a classified result of the second image based on the texture feature of the second image and a preset classification function; and
determining whether the target object image is a real target object image based on the classified result.

19. The storage medium according to claim 18, wherein the Fourier transformed first image comprises a plurality of components,
wherein each of the plurality of components comprises a frequency value and an amplitude value,
wherein the plurality of components comprise a plurality of high frequency components, each of the plurality of high frequency components comprises a frequency higher than a frequency threshold and an amplitude value greater than a component threshold; and
wherein the plurality of components comprise an initial component comprising a frequency equals to 0;
wherein in determining whether the first object image is a preliminary real target image, the set of instructions further direct the at least one processor to perform acts of:
calculating a first summation, being a sum of the amplitude values of the plurality of high frequency components of the Fourier transformed first image;
calculating a second summation, being a sum of the amplitude values of the plurality of components of the Fourier transformed first image;
determining a difference between the second summation and the amplitude value of the initial component of the Fourier transformed first image;
determining a high frequency components module of the first image, being a ratio of the first summation and the difference;
determining that the first image is a preliminary real target object image when the high frequency components module is greater than a preset threshold, and
determining that the first image is a preliminary faked target object image when the high frequency components module is less than the preset threshold.

20. The storage medium according to claim 18, wherein in executing the DCT Treatment on the target object image, the set of instructions further direct the at least one processor to perform acts of:
obtaining a DCT transformed value of every pixel of the target object image by executing the DCT transformation on the target object image;
capturing, from an effective area of the DCT transformed target object image, a DCT image based on the DCT transformed value of every pixel of the target object image; and
obtaining the second image by executing an inversed DCT transformation on the DCT image,
wherein the effective area is an area on the DCT transformed target object image where the DCT transformed values of the pixels thereon change smoothly or where the DCT transformed values of the pixels thereon meet a preset criteria.

* * * * *